United States Patent [19]

Sundet et al.

[11] Patent Number: 5,206,952
[45] Date of Patent: Apr. 27, 1993

[54] FAULT TOLERANT NETWORKING ARCHITECTURE

[75] Inventors: James W. Sundet, Chippewa Falls; Roger G. Brown, Colfax, both of Wis.

[73] Assignee: Cray Research, Inc., Eagan, Minn.

[21] Appl. No.: 582,507

[22] Filed: Sep. 12, 1990

[51] Int. Cl.$^5$ .............................................. G06F 13/14
[52] U.S. Cl. .................................... 395/725; 395/575; 364/DIG. 2; 364/940.1; 364/940.51; 364/931.4; 364/944.61
[58] Field of Search ................... 395/725, 575; 371/36

[56] References Cited

U.S. PATENT DOCUMENTS

| | | | |
|---|---|---|---|
| 3,317,898 | 5/1967 | Hellerman | 395/425 |
| 3,337,854 | 8/1967 | Cray et al. | 395/550 |
| 3,348,210 | 10/1967 | Oschsner | 395/650 |
| 3,444,525 | 5/1969 | Barlow et al. | 395/200 |
| 3,566,357 | 2/1971 | Ling | 395/650 |
| 3,735,360 | 5/1973 | Anderson et al. | 395/250 |
| 3,833,889 | 9/1974 | Cray | 395/400 |
| 4,051,551 | 9/1977 | Lawrie et al. | 395/425 |

(List continued on next page.)

FOREIGN PATENT DOCUMENTS

| | | |
|---|---|---|
| 957779 | 11/1974 | Canada . |
| 1216669 | 1/1987 | Canada . |
| 1218754 | 3/1987 | Canada . |
| 1228675 | 10/1987 | Canada . |
| 1242284 | 9/1988 | Canada . |
| 0035778 | 9/1981 | European Pat. Off. . |
| 0123509 | 10/1984 | European Pat. Off. . |
| 0165914 | 12/1985 | European Pat. Off. . |
| 0165915 | 12/1985 | European Pat. Off. . |
| 0230029 | 7/1987 | European Pat. Off. . |
| 2057030 | 8/1971 | Fed. Rep. of Germany . |
| 57-27363 | 2/1982 | Japan . |

OTHER PUBLICATIONS

I & CS-Industrial and Process Control Magazine, vol. 60, No. 10, Oct. 1987, Radnor, Pa., U.S.A., J. A. Humphry: "Applying Fault to Tolerant System Architectures".
Patent Abstracts of Japan, vol. 8, No. 237 (p-310) (1674) 30 Oct. 1984, & JP, 59 113 600 (Nippon Denki KK) 30 Jun. 1984.
"The Parallel and the Pipeline Computers", by William R. Graham.
"Shared Memories in the CYBA-M Multiprocessor", by E. L. Dagless; M. D. Edwards; and J. T. Proudfoot.
"Computer Systems Architecture" by Jean-Loup Baer.

Primary Examiner—Michael R. Fleming
Assistant Examiner—Debra A. Chun
Attorney, Agent, or Firm—Merchant, Gould, Smith, Edell, Welter & Schmidt

[57] ABSTRACT

A fault tolerant network for a plurality of computers includes a system for controlling access to shared peripherals. Access to the shared peripherals is coordinated among the computers by means of communication through a semaphore box. Each computer connects to the semaphore box via a channel. The semaphore box is comprised of two major sections: a semaphore section and an I/O section. The semaphore section contains two sets of semaphores: a first set comprising reservation semaphores for the shared peripherals; and a second set comprising heartbeat semaphores for the sharing computers. The first set is used to reserve a particular peripheral for a particular computer and indicate the source of the reservation; the second set provides a "heartbeat" to prevent reservation semaphores from being set indefinitely in the event communication with a particular computer is lost.

11 Claims, 5 Drawing Sheets

U.S. PATENT DOCUMENTS

| | | | |
|---|---|---|---|
| 4,073,005 | 2/1978 | Parkin | 395/650 |
| 4,104,720 | 8/1978 | Gruner | 395/775 |
| 4,115,851 | 9/1978 | Nagano et al. | 395/425 |
| 4,128,880 | 12/1978 | Cray, Jr. | 395/800 |
| 4,130,864 | 12/1978 | Schlotterer | 395/725 |
| 4,149,242 | 4/1979 | Pirz | 395/325 |
| 4,212,057 | 7/1980 | Devlin et al. | 395/425 |
| 4,280,176 | 7/1981 | Tan | 395/425 |
| 4,365,292 | 12/1982 | Barnes et al. | 395/800 |
| 4,380,798 | 4/1983 | Shannon et al. | 395/725 |
| 4,392,200 | 7/1983 | Arulpragasam et al. | 395/425 |
| 4,394,725 | 7/1983 | Bienvenu et al. | 395/375 |
| 4,394,727 | 7/1983 | Hoffman et al. | 395/650 |
| 4,394,730 | 7/1983 | Suzuki et al. | 395/725 |
| 4,400,769 | 8/1983 | Kaneda et al. | 395/650 |
| 4,400,771 | 8/1983 | Suzuki | 395/425 |
| 4,402,046 | 8/1983 | Cox et al. | 395/200 |
| 4,449,183 | 5/1984 | Flahive et al. | 395/425 |
| 4,455,602 | 6/1984 | Baxter, III et al. | 395/775 |
| 4,480,304 | 10/1984 | Carr et al. | 395/725 |
| 4,493,036 | 1/1985 | Boudreau et al. | 395/725 |
| 4,507,728 | 3/1985 | Sakamoto et al. | 395/375 |
| 4,509,140 | 4/1985 | Cheung | 395/425 |
| 4,562,532 | 12/1985 | Nishizawa et al. | 395/425 |
| 4,563,738 | 1/1986 | Klan | 395/325 |
| 4,594,682 | 6/1986 | Drimak | 395/800 |
| 4,630,230 | 12/1986 | Sundet | 395/425 |
| 4,636,942 | 1/1987 | Chen et al. | 395/725 |
| 4,661,900 | 4/1987 | Chen et al. | 395/800 |
| 4,720,780 | 1/1988 | Dolecek | 395/800 |
| 4,745,545 | 5/1988 | Schiffleger | 395/325 |
| 4,754,398 | 6/1988 | Pribnow | 395/200 |
| 4,766,535 | 8/1988 | Auerbach et al. | 395/425 |
| 4,771,378 | 9/1988 | Halford | 395/325 |
| 4,777,593 | 10/1988 | Yoshida | 395/800 |
| 4,805,173 | 2/1989 | Hillis et al. | 371/40.1 |
| 4,807,121 | 2/1989 | Halford | 395/275 |
| 4,901,230 | 2/1990 | Chen et al. | 395/325 |
| 4,951,246 | 8/1990 | Fromm et al. | 395/425 |

30

|  | COL 0 | COL 1 | COL 2 | COL 3 | COL 4 | COL 5 | COL 6 | COL 7 |
|---|---|---|---|---|---|---|---|---|
| ROW 0 | 00 | 01 | 02 | 03 | 04 | 05 | 06 | 07 |
| ROW 1 | 10 | 11 | 12 | 13 | 14 | 15 | 16 | 17 |
| ROW 2 | 20 | 21 | 22 | 23 | 24 | 25 | 26 | 27 |
| ROW 3 | 30 | 31 | 32 | 33 | 34 | 35 | 36 | 37 |
| ROW 4 | 40 | 41 | 42 | 43 | 44 | 45 | 46 | 47 |
| ROW 5 | 50 | 51 | 52 | 53 | 54 | 55 | 56 | 57 |
| ROW 6 | 60 | 61 | 62 | 63 | 64 | 65 | 66 | 67 |
| ROW 7 | 70 | 71 | 72 | 73 | 74 | 75 | 76 | 77 |

FIG. 3

| CODE | | OPERATION |
|---|---|---|
| F1 | F0 | |
| 0 | 0 | TEST SEMAPHORE |
| 0 | 1 | SET SEMAPHORE UNCONDITIONALLY |
| 1 | 0 | CLEAR SEMAPHORE UNCONDITIONALLY |
| 1 | 1 | TEST AND SET SEMAPHORE IF CLEAR NO OPERATION IF SEMAPHORE IS SET |

FAULT TOLERANT NETWORKING ARCHITECTURE

BACKGROUND OF THE INVENTION

1. Field Of The Invention

This invention relates generally to computer networks, and in particular to a fault tolerant network having a semaphore box for controlling access to shared peripherals by a plurality of computers.

2. Description of Related Art

Multiprocessor systems typically include some method of providing interprocessor communication. For example, interprocessor communication through a shared main memory is typically referred to as a "loosely coupled" computer system. Interprocessor communication through shared registers is typically referred to as a "tightly coupled" computer system. Prior patent of the Assignee of the present invention, Cray Research, Inc., disclose various forms of interprocessor communication.

One such prior patent is U.S. Pat. No. 4,636,942, issued Jan. 13, 1987, to Chen et al., which patent is incorporated herein by reference. This patent discloses a computer vector multiprocessing control wherein a pair of processors are provided and each are connected to a central memory through a plurality of memory reference ports. Processors are further connected to a plurality of shared registers, including registers for holding scalar and address information, and registers for holding information to be used in coordinating the transfer of information through the shared registers.

Another prior patent is U.S. Pat. No. 4,661,900, issued Apr. 28, 1987, to Chen et al., which patent is incorporated herein by reference. This patent discloses a flexible chaining method and apparatus wherein a part of processors are connected to a central memory through a plurality of memory reference ports. The processors are connected to a plurality of shared registers that may be directly addressed by either processor, and which hold scalar and address information in registers for holding information to be used in coordinating the transfer of information through the shared registers.

Still another prior patent is U.S. Pat. No. 4,754,398, issued Jun. 28, 1988, to Pribnow, which patent is incorporated herein by reference. This patent discloses an interprocessor communication system for a multiprocessor system that includes a plurality of clusters having a plurality of semaphore registers and information registers.

Whatever the merits of these prior patents for controlling interprocessor communication, they do not achieve the benefits of the present invention.

SUMMARY OF THE INVENTION

The present invention discloses a fault tolerant network for computers that includes a semaphore box for controlling access to shared peripherals. The semaphore box is comprised of two major sections: an I/O section and a semaphore section. The semaphore section contains two sets of semaphores: a first set comprising reservation semaphores for the shared peripherals and a second set comprising heartbeat semaphores for the sharing computers. The first set is used to reserve a particular peripheral for a particular computer; the second set provides a "heartbeat" to prevent reservation semaphores from being set indefinitely in the event communication with a particular computer is lost.

The heartbeat semaphores are arranged in an array. Each time a semaphore command is received, a row of heartbeat semaphores is set. When the command completes, a column of heartbeat semaphores is returned to the requesting computer and then cleared. If the heartbeat semaphore in a particular position of the column is set, then the associated computer has accessed the semaphore box sometime between the current access of the requesting computer and its prior access. Conversely, if the particular heartbeat semaphore is cleared, then the associated computer has not accessed the semaphore box during the period. If the particular heartbeat semaphore for the associated computer remains cleared for some number of consecutive accesses, the requesting computer should conclude that the associated computer has lost communication with the semaphore box.

BRIEF DESCRIPTION OF THE DRAWINGS

Referring now to the drawings, in which like reference numbers represent like elements throughout the several views:

FIG. 3 is an illustration of an array of heartbeat semaphores in the preferred embodiment;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be used and structural changes may be made without departing from the scope of the present invention.

GLOSSARY

In the following description, the term "semaphore" is often used. In the preferred embodiment, this term refers to a memory cell that is shared by a plurality of processors to provide a form of communication between the processors by indicating when significant events have taken place.

SYSTEM CONFIGURATION

Figure 1:
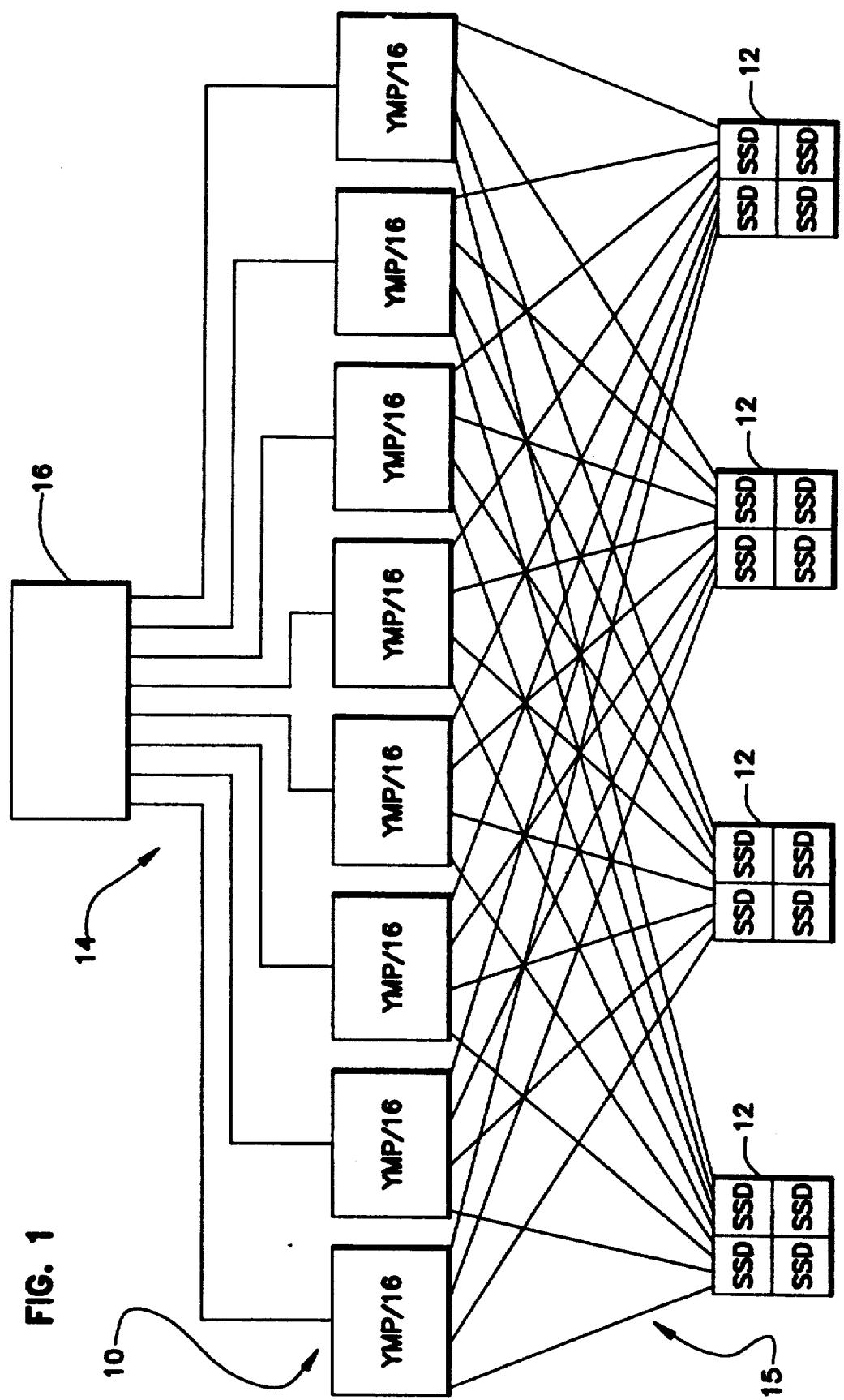
FIG. 1 is a block diagram of a system configuration according to the preferred embodiment.

FIG. 1 is a block diagram of a system configuration according to the preferred embodiment of the present invention. The present invention discloses a fault tolerant network for computers 10 that includes a semaphore box 16 for controlling access to shared peripherals 12.

The computers 10 may be YMP/16 computers of the type manufactured by Cray Research, Inc., the Assignee of the present invention. The peripherals 12 may be Solid-state Storage Devices (SSDs) of the type described in either U.S. Pat. No. 4,630,230, issued Dec. 16, 1986, to Sundet (which patent is incorporated herein by reference), or in U.S. Pat. No. 4,951,246, issued Aug. 21, 1990, to Fromm et al. (which patent is incorporated herein by reference). Those skilled in the art, however, will recognize that other computers 10 and other peripherals 12 could substituted therefor.

Each peripheral 12 connects to the computers 10 via a channel 15. Each computer 10 connects to a semaphore box 16 via a channel 14. Access to the shared peripherals 12 is coordinated among the computers 10 by means of communication through the semaphore box 16.

SEMAPHORE BOX

Figure 2:
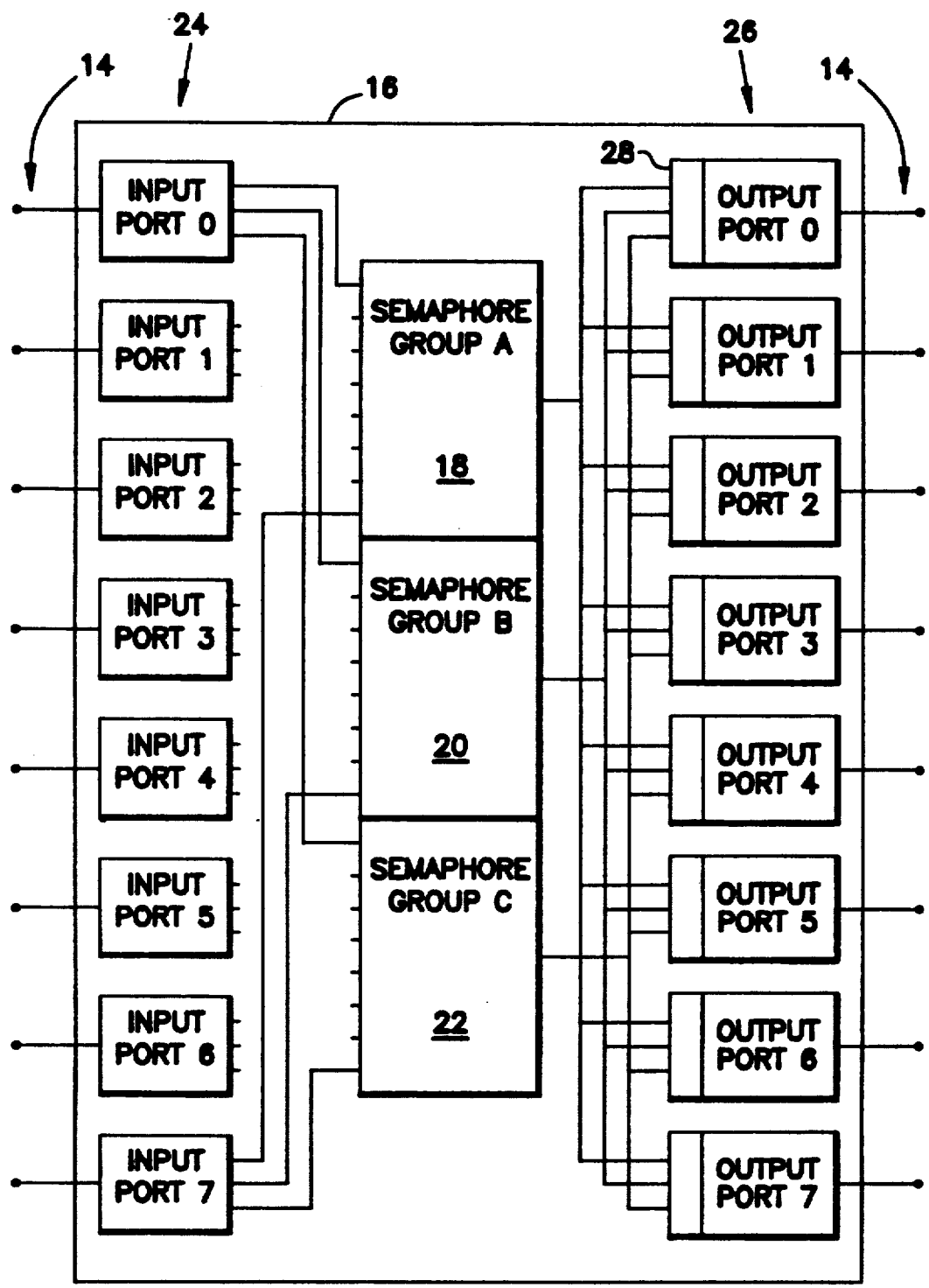
FIG. 2 is a block diagram of the semaphore box in the preferred embodiment.

A block diagram of the semaphore box 16 is shown in FIG. 2. The semaphore box 16 is comprised of two major sections: a semaphore section and an I/O section.

The semaphore section contains two sets of semaphores: a first set comprising reservation semaphores for the shared peripherals 12; and a second set comprising heartbeat semaphores for the sharing computers 10. The first set is used to reserve a particular peripheral 12 for a particular computer 10; the second set provides a "heartbeat" to prevent reservation semaphores from being set indefinitely in the event communication with a particular computer 10 is lost. In the preferred embodiment, there are three identical copies, or groups 18, 20, and 22, of the two sets arranged in a triple module redundant configuration.

The reservation semaphores can be individually set cleared, or tested by commands received by the semaphore box 16 from the computers 10. In the preferred embodiment, each reservation semaphore is four bits long. One bit contains reservation information associated with one of the peripherals 12; the other three bits are a port identifier field containing a number of the input port 24 which most recently set the reservation semaphore. The port identifier field thus identifies a particular computer 10 connected to the associated input port 24. The port identifier field is updated each time the reservation semaphore is set.

FIG. 3 is an illustration of an array 30 of heartbeat semaphores, wherein each heartbeat semaphore is identified by a concatenated row-column value. The array 30 measures eight by eight, but those skilled in the art will recognize that any size array 30 may be used. The array 30 of heartbeat semaphores is used to prevent the reservation semaphores from remaining in a "set" condition after communication with a computer 10 has been lost. A reservation semaphore that remains "set" prevents access to the associated peripheral 12 by the other computers 10.

Each time a semaphore command is received by the semaphore box 16, a row of heartbeat semaphores is set. Preferably, the row number is the same as the number of the input port 24 which received the command, although other means of associating rows with computers 10 could be used. When the command completes, a column of heartbeat semaphores is returned to the requesting computer 10 by the output port 26 and then cleared. The column becomes part of the channel status word. Like the row number, the column number is preferably the same as the number of the input port 24 which received the command, although other means of associating columns with computers 10 could be used.

The heartbeat semaphores provide a means of determining whether the computers 10 connected to the semaphore box 16 are still active. This is best illustrated by the following example. Assume computer A wants to determine the running status of computer B. Each time computer B sends a command to the semaphore box 16, all heartbeat semaphores in row B are set. Each time computer A sends a command to the semaphore box 16, the heartbeat semaphores in column A are returned in the channel status word and then cleared. Since the rows and columns intersect, the Bth heartbeat semaphore in column A indicates whether computer B has accessed the semaphore box 16 in the period since the previous computer A access. If the heartbeat semaphore is set, computer B has accessed the semaphore box 16 sometime between the current access of computer A and the prior access of computer A. Conversely, if the heartbeat semaphore is clear, computer B has not accessed the semaphore box 16 during the period. If the heartbeat semaphore for computer B is clear for some number of consecutive accesses or some predetermined interval, then computer A concludes that computer B has lost communication with the semaphore box 16 and takes appropriate action. Those skilled in the art will recognize that the number of consecutive accesses or the predetermined interval is programmable. Thus, any computer 10 connected to the semaphore box 16 must periodically access the semaphore box 16 to keep its "heartbeat" alive.

Referring again to FIG. 2, the I/O section of the semaphore box 16 consists of input ports, voting circuits, and output ports. Each attached computer 10 communicates with the semaphore box 16 across a channel 14 which attaches to the semaphore box 16 at an input port 24 and an output port 26. Preferably, the computer 10 is attached to an output port 26 identically numbered or otherwise associated with an input port 24. Each input port 24 and output port 26 of the semaphore box 16 is logically independent from the others. Operations on the semaphore box 16 are accomplished by transmitting commands to the input port 24. The input port 24 then transmits the commands to all three of the semaphore groups 18, 20, and 22. (Note that in FIG. 2 only a portion of the connections between the input ports 24 and the semaphore groups 18, 20, and 22 are illustrated.) The semaphore groups 18, 20, and 22 transmit the results of the operation to a voting circuit 28. The three copies of the results are inspected by voting circuits 28. The voting circuits 28 detect an error if there is a difference in the execution results. If a single semaphore group 18, 20, or 22 is in error, its results are ignored by the voting circuits 28. If two semaphore groups 18, 20, or 22 fail, all comparisons will fail and the results of group 20 are used (although there is no assurance that the results of group 20 are correct). The output port 26 then transmits the results to the computer 10.

A port conflict occurs when more than one command is received by the semaphore section from the I/O section in the same clock period. Conflicts are resolved on a priority basis in the preferred embodiment, although other methods of resolving conflicts could be substituted therefor. In the preferred embodiment, lower numbered input ports 24 have priority over higher numbered input ports 24. Thus, requests from higher numbered input ports 24 are held until the semaphore response for the lower numbered input port 24 is returned to the I/O section. The requests are not queued, although alternative embodiments could easily implement such a scheme. Instead, in the preferred embodiment, if a lower numbered request is received while a higher number request is being held, the lower numbered request will again be honored first.

OPERATION

Figures 4, 5:
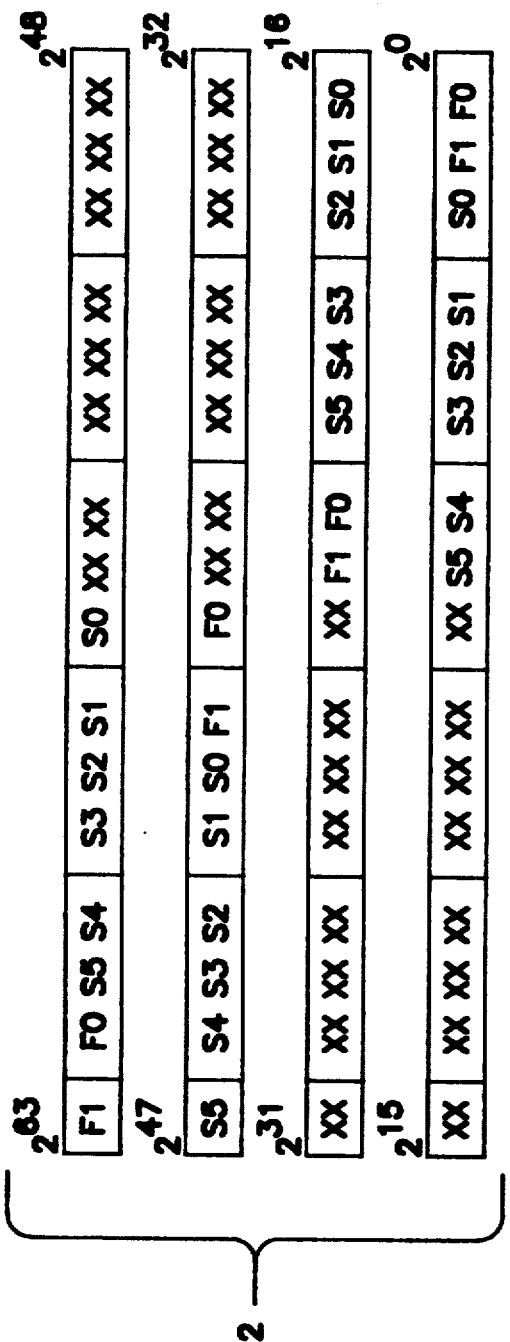
FIG. 4 illustrates a channel command word in the preferred embodiment.
FIG. 5 illustrates four possible function codes of the channel co word in the preferred embodiment.

FIG. 4 illustrates a channel command word 32 in the preferred embodiment. The channel command word 32 consists of a single 64-bit word. It is transmitted over the channel 14 as four 16-bit parcels followed by a channel disconnect pulse. After an input port 24 receives the channel command word 32, it performs error checks to detect possible parity errors, command compare errors, or channel protocol errors. Detection of a channel error aborts the operation.

Each parcel of the channel command word 32 contains the same information, but the individual bit assignments differ in each parcel. Rearranging the bit assignments prevents a defective wire, connector pin, or associated circuits from causing a catastrophic error.

Eight bits of each parcel are used to hold a command. The remaining eight bits are unused, except for parity, and may contain any value. Of the eight command bits, two bits contain a semaphore function code and six bits contain a semaphore select code. The four possible function codes are described in FIG. 5. The semaphore select code determines which of the reservation semaphores are affected by the semaphore function code.

Each parcel is sent to a different semaphore group for execution: parcel 0 is sent to semaphore group 18; parcel 1 is sent to semaphore group 20; parcel 2 is sent to semaphore group 22; parcel 3 is discarded. Upon completion, the appropriate output port 26 receives results from each of the three semaphore groups 18, 20, and 22. Both reservation semaphore and heartbeat semaphore information is contained in the results. The three copies of the results are inspected by voting circuits 28 and an appropriate channel status word is transmitted by the output port 26 to the originating computer 10. If the command received from the input port 24 had been in error, the voting circuits 28 detect the error and prevent corruption of any data on the shared peripherals 12.

Figure 6:
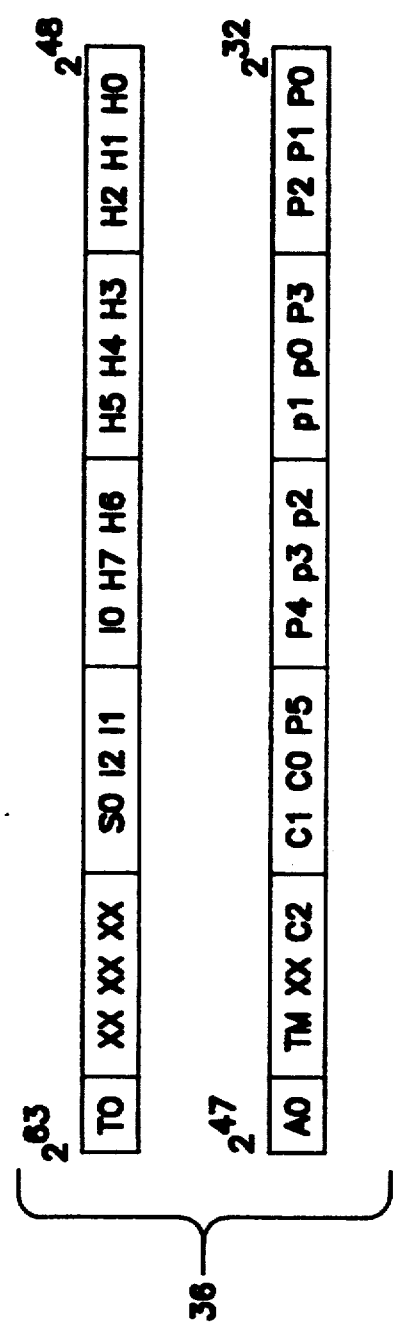
FIG. 6 illustrates the format of the channel status word in the preferred embodiment.

FIG. 6 illustrates the format of the channel status word 36, which consists of two 16-bit parcels followed by a channel disconnect pulse. The format is further described below.

RESERVATION SEMAPHORE STATUS (T-, S-, I-)

The uppermost bit (T0) of the channel status word 36 is used only for a test and set operation. It reflects the state of the selected reservation semaphore at the time the function code is received by the semaphore section. Bit T0 is set to the value 1 if the reservation semaphore is initially set. Otherwise, a value of 0 is returned in this position if the reservation semaphore is initially clear, and the set operation has been performed.

Bit S0 reflects the condition of the selected reservation semaphore at the start of the current command.

Bits I0-I2 indicate the number of the input port 24 (having a value of 0-7) which most recently changed the state if the selected reservation semaphore.

HEARTBEAT STATUS (H-)

The heartbeat status byte provides each computer 10 with information about the availability of the other computers 10 connected to the semaphore box 16. The bit position (H0-H7) of the heartbeat status corresponds to the input port 24 (0-7) which controls the setting of the particular heartbeat semaphore.

PORT STATUS (A-, C-, P-, TM)

Bit A0 is 1 if an error is detected by the input port 24 or output port 26. Bit A0 is a summation of bits C2-C0, P5, P4, p3-p0, and P3-P0 further described below.

Bits C0-C2 (semaphore compare error) are set if there is an error in the execution results. The comparison is performed on 13 bits: the selected 4-bit semaphore, a semaphore test flag, and the 8-bit heartbeat semaphore column. A semaphore compare error could be caused by any of several conditions; a hardware malfunction; a command error; residue from a previous command error; or a semaphore group 18, 20, or 22 whose contents have not been fully restored following a power loss or maintenance action. If a single semaphore group 18, 20, or 22 is in error, its results are ignored by the voting circuits 28. If two semaphore groups 18, 20, or 22 fail, all comparisons will fail and the results of group 20 are used (although, there is no assurance that the results of group 20 are correct).

Bit C0 is set if information from semaphore group 18 fails to compare with either group 20 or 22. Similarly, bit C1 is set if information from semaphore group 20 fails to compare with either group 18 or 22. Bit C2 is set if information from semaphore group 22 fails to compare with either group 18 or 20.

Bits P5-P0 indicate an error was detected during receipt of the command by the input port 24. If P5-P0 are set, the command is aborted and parcel 0 of the channel status word 36 is invalid.

Bit P5 is set if the function codes do not match in all four parcels of the channel command word 32. This could be the result of a programming error or a data error in the channel command word 32. The requested operation is aborted and the command is not sent to the semaphore groups 18, 20, and 22. In the channel status word 36, the P5 bit (command compare error) is then set and parcel 0 of the channel status word 36 is invalid.

Bit P4 indicates that a channel protocol error was detected by the input port 24 or output port 26. Normal protocol is defined as four ready pulses each with its accompanying parcel of data followed by a disconnect pulse. A resume pulse must be returned before a subsequent ready pulse is received. If more than four ready pulses are received before a disconnect pulse, then a channel protocol error has occurred. If a channel protocol error is detected, then all command data is assumed to have been corrupted and is ignored. The stat of the heartbeat semaphores is not changed and information in parcel 0 of the channel status word 36 is invalid. Bit P4 in the channel status word 36 is set. However, no channel status word 36 is transmitted until a disconnect pulse is received. This ensures that any extra command parcels are flushed.

Additionally, the appropriate parity bits p3-p0 and P3-P0 are set in the event of a data error. Four parity bits accompany each parcel of the channel command word 32. Bits P3-P0 perform a parity check using true logic levels, while bits p3-p0 perform a parity check using false logic levels. Thus, independent redundant checks are performed. Additionally, the P5 bit (command error) is set if a data bit rather than a parity bit caused the parity error.

Bit TM is set to 1 when the output port 26 has been placed in test mode.

OTHER FEATURES

The semaphore box 16 was designed for fault tolerance. For example, the semaphore box 16 may remain online and operational during repairs without impacting the integrity of the semaphores. Further, even if two of the three semaphore groups 18, 20, and 22 fail, the semaphore box 16 continues operating using the remaining group. As mentioned above, if no group compares correctly with any other, group 20 is used.

All logic modules are supplied with a common clock from a master clock module and operate synchronously with one another. The master clock module is duplicated on a second module for backup purposes, but only one clock module may be powered on at any given time. Each logic module is provided with two clock inputs, one for each clock module. Selection of the active master clock module is by means of a manual switch which controls power to the clock module and provides the logical clock enable signals. During the process of switching from one clock module to another, however, the system clock is not valid and the system requires re-initialization.

The semaphore box 16 resides in a standalone cabinet with its own cooling and internal power. Cooling is accomplished with forced room air. Multiple fans provide redundancy so that if a single fan malfunctions the equipment still remains operational.

Power is provided by four set s of identical power supplies to enhance fault tolerance. Each set of supplies is sized so that it is able to supply all the necessary power needs independently of the other. Power load shifting from the loss of one supply is automatic.

Each input port 24, output port 26, semaphore group 18, 20, and 22, and the master clock are tied to a common power bus, so that they may be individually disconnected from the power bus. Thus, no more than one module is affected by the loss of a single power supply breaker. Further, if power is removed from a single module, all other modules remain operational. Except for the master clock module, the process of applying or removing power to a single module does not affect the operation of the other modules. In addition, if a single module is removed from the system, all other modules remain operational. Thus, the process of inserting or removing modules does not affect the operation of the other modules.

SUMMARY

In summary, a fault tolerant network has been described which includes a semaphore box 16 for controlling access to shared peripherals 12. The semaphore box 16 is comprised of two major sections: an I/O section and a semaphore section. The semaphore section contains reservation semaphores and heartbeat semaphores. The reservation semaphores are used to reserve a particular peripheral 12 for a particular computer 10; the heartbeat semaphores prevent reservation semaphores from being set indefinitely in the event communication with a particular computer 10 is lost.

The heartbeat semaphores are arranged in an array, wherein each time a command is received, a row of heartbeat semaphores is set. Further, when the command completes, a column of heartbeat semaphores is returned to the requesting computer 10 and then cleared. Thus, if the heartbeat semaphore in a particular position of the column is set, then the associated computer 10 has accessed the semaphore box 16 sometime between the current access of the requesting computer 10 and its prior access. Conversely, if the particular heartbeat semaphore is cleared, then the associated computer 10 has not accessed the semaphore box 16 during the period. The requesting computer 10 should conclude that the associated computer 10 has lost communication with the semaphore box 16 if the particular heartbeat semaphore for the associated computer 10 remains cleared for some number of consecutive accesses or some predetermined interval.

CONCLUSION

The foregoing description of the preferred embodiment of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A fault-tolerant apparatus for controlling access to a plurality of shared peripherals by a plurality of computers, comprising:
   input means for receiving reservation information from the plurality of computers;
   a redundant set of reservation semaphores for storing the reservation information and for reserving a selected one of the peripherals for a selected one of the plurality of computers;
   a redundant set of heartbeat semaphores for indicating whether the selected one of the plurality of computers has sent reservation information during a predetermined time period;
   voting means for comparing at least a portion of the members of the redundant set of reservation semaphores, for comparing at least a portion of the members of the redundant set of heartbeat semaphores and for selecting a majority decision to produce a majority result therefrom;
   output means for returning the majority result to the plurality of computers; and
   means for clearing a selected portion of the heartbeat semaphores after returning the majority result.

2. The fault-tolerant apparatus of claim 1, wherein each redundant set of heartbeat semaphores is arranged as a two-dimensional array comprising a plurality of intersecting rows and columns such that each row is associated with one of the plurality of computers and each column is associated with one of the plurality of computers.

3. The fault-tolerant apparatus of claim 2, further comprising:
   means for setting the members of a selected row each time reservation information is received from one of the plurality of computers associated with the selected row;
   means for returning the values of the members of a selected column to one of the plurality of computers associated with the selected column each time reservation information is received from the associated one of the plurality of computers; and
   means for clearing the members of the selected column after returning the values of the members of a selected column so that the values in the intersecting points of the array may be later set and later examined by other ones of the plurality of computers to indicate active communication.

4. A fault-tolerant system for sharing multiple peripherals between a plurality of computers, comprising:

a plurality of peripherals each being attached to each of a plurality of computers;

a semaphore box attached to each of said plurality of computers having a plurality of input ports, a redundant set of semaphores and a plurality of output ports;

each of said plurality of input ports being attached in a dedicated fashion to one of said plurality of computers through a communications channel; and each of said plurality of output ports being attached in a dedicated fashion to one of said plurality of computers through said channel and including voting circuitry to select among a majority of said redundant set of semaphores.

5. The fault-tolerant system of claim 4 wherein said redundant set of semaphores further includes a plurality of reservation semaphores operable for reserving one of said plurality of peripherals and further including a plurality of heartbeat semaphores operatively connected to each of said reservation semaphore for indicating whether the accessing computer has communicated with the apparatus during some time period, thereby preventing the reservation semaphore from being reserved indefinitely when communications are lost with the accessing computer occurs.

6. The fault-tolerant system of claim 4 wherein said channel is further connected to convey a plurality of redundant reservation and heartbeat flags such that each semaphore of said redundant set of semaphores is modified by a different one of said plurality of redundant reservation and heartbeat flags.

7. The fault-tolerant system of claim 6 wherein said plurality of redundant reservation and heartbeat flags comprise different bit positions on said channel such that each semaphore of said redundant set of semaphores is modified by a different bit position of said plurality of redundant reservation and heartbeat flags.

8. A method for preventing the indefinite reservation of one of a plurality of shared peripherals by one of a plurality of computers using dedicated heartbeat semaphores assigned to each of the plurality of computers, comprising the steps of:

a.) sending reservation commands to a central location to reserve one of the plurality of peripherals by each of the plurality of computers;

b.) servicing the reservation commands such that each of the plurality of computers is an accessing computer for the following substeps:

b1.) setting a reservation semaphore to reserve the peripheral for the accessing computer;

b2.) setting the heartbeat semaphores assigned to the accessing computer to indicate a communication from the accessing computer has occurred;

b3.) returning the values of a plurality of the heartbeat semaphores to the accessing computer;

b4.) clearing the plurality of heartbeat semaphores;

c.) counting a time interval that each of the values of the plurality of heartbeat semaphores remains cleared;

d.) clearing any reservation semaphores that were set by one of the plurality of computers if the interval is greater than a predetermined amount.

9. The method of claim 8, wherein the step of sending reservation commands includes the substeps of:

a1.) placing the reservation commands in a first parcel using a first bit assignment;

a2.) sending the first parcel over a channel to the central location;

a3.) placing the reservation commands in a second parcel using a second bit assignment;

a4.) sending the second parcel over the channel to the central location; and a5.) performing error checking between the first parcel and the second parcel received at the central location to detect communication errors.

10. The method of claim 8, wherein substep b1 includes the substep of setting a plurality of redundant reservation semaphores;

wherein substep b2 includes the substep step of setting a plurality of redundant heartbeat semaphores assigned to the accessing computer; and wherein substep b3 includes the substep of comparing the values in the plurality of redundant reservation semaphores and returning the values of the redundant reservation semaphores which match most often.

11. The method of claim 8, wherein the plurality of the heartbeat semaphores are arranged in a two dimensional matrix with each row associated with each of the plurality of computers;

wherein substep b2 includes setting the heartbeat semaphores in the row associated with the accessing computer to indicate a communication from the accessing computer has occurred;

wherein substep b3 includes returning the values of a column of the matrix of the plurality of the heartbeat semaphores to the accessing computer; and wherein substep b4 includes clearing the column of the matrix of the plurality of heartbeat semaphores which was returned to the accessing computer.

* * * * *

UNITED STATES PATENT AND TRADEMARK OFFICE
CERTIFICATE OF CORRECTION

PATENT NO. : 5,206,952

DATED : April 27, 1993

INVENTOR(S) : James W. Sundet et al.

It is certified that error appears in the above-identified patent and that said Letters Patent is hereby corrected as shown below:

In column 1, line 21, "disclose" should read --discloses-- therefore.

In columns 3, line 28, insert --,-- after the word "set" therefore.

In column 5, line 60, "if" should read --of-- therefore.

In columns 6, line 50, "stat" should read --state-- therefore.

In column 7, line 29, "set s" should read --sets-- therefore.

Signed and Sealed this

Twenty-second Day of March, 1994

Attest:

BRUCE LEHMAN

Attesting Officer          Commissioner of Patents and Trademarks